(12) United States Patent
Abouelleil et al.

(10) Patent No.: US 9,945,487 B2
(45) Date of Patent: *Apr. 17, 2018

(54) CHECK VALVE WITH ACCELERATED CLOSURE

(71) Applicant: Mueller International, LLC, Atlanta, GA (US)

(72) Inventors: Ashraf Abouelleil, Oswego, IL (US); Julian Ramirez, Aurora, IL (US); Purushottam Savalia

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,763

(22) Filed: Aug. 4, 2017

(65) Prior Publication Data

US 2017/0343122 A1 Nov. 30, 2017

Related U.S. Application Data

(63) Continuation of application No. 14/994,741, filed on Jan. 13, 2016, now Pat. No. 9,752,692.

(51) Int. Cl.
*F16K 15/03* (2006.01)
*F16K 27/02* (2006.01)
(Continued)

(52) U.S. Cl.
CPC .......... *F16K 15/033* (2013.01); *F16K 15/031* (2013.01); *F16K 15/144* (2013.01);
(Continued)

(58) Field of Classification Search
CPC ............ Y10T 137/7893; Y10T 137/79; Y10T 137/7898; Y10T 137/7892;
(Continued)

(56) References Cited

U.S. PATENT DOCUMENTS 291,773 A 1/1884 Reilly
349,549 A 9/1886 West
(Continued)

FOREIGN PATENT DOCUMENTS

CA 2635547 3/2013

OTHER PUBLICATIONS

Abouelleil, Ashraf; Issue Notification for U.S. Appl. No. 14/994,741, filed Jan. 13, 2016, dated Aug. 16, 2017, 1 pg.
(Continued)

*Primary Examiner* — Atif Chaudry
(74) *Attorney, Agent, or Firm* — Taylor English Duma LLP

(57) ABSTRACT

A check valve including a valve body and a flapper assembly, the valve body defining an inlet, an outlet, an interior cavity, and a port in the interior cavity; the flapper assembly movable between an open position, providing fluid communication between the inlet and outlet, and a closed position, isolating the inlet from the outlet, the flapper assembly including a resilient body and a spring assembly, the spring assembly configured to bias the flap portion of the resilient body towards the closed position, the spring assembly including a spring and a backing plate mounted on opposite surfaces of the resilient body and configured to increase the stiffness of the intermediate portion of the resilient body.

18 Claims, 7 Drawing Sheets

(51) Int. Cl.
*F16K 15/04* (2006.01)
*F16K 15/16* (2006.01)
*F16K 15/14* (2006.01)

(52) U.S. Cl.
CPC .......... *F16K 15/16* (2013.01); *F16K 27/0227* (2013.01); *Y10T 137/7891* (2015.04); *Y10T 137/7892* (2015.04); *Y10T 137/7893* (2015.04); *Y10T 137/7898* (2015.04); *Y10T 137/79* (2015.04)

(58) Field of Classification Search
CPC .............. Y10T 137/7891; F16K 15/031; F16K 27/0227; F16K 15/033; F16K 15/144; F16K 15/16
See application file for complete search history.

(56) References Cited

U.S. PATENT DOCUMENTS

| | | | |
|---|---|---|---|
| 673,674 | A | 5/1901 | Baker |
| 935,412 | A | 9/1909 | Rust |
| 1,070,667 | A | 8/1913 | Clark |
| 1,720,444 | A | 7/1929 | Rowley |
| 1,960,472 | A | 5/1934 | Balaam et al. |
| 2,629,448 | A | 2/1953 | Duggan |
| 3,292,658 | A | 12/1966 | Scaramucci |
| 3,539,150 | A | 11/1970 | Conrad |
| 3,809,119 | A | 5/1974 | Cave |
| 4,139,931 | A | 2/1979 | Royce |
| 4,191,205 | A | 3/1980 | Nash |
| 4,227,544 | A | 10/1980 | Luckenbill |
| 4,469,122 | A | 9/1984 | Meek |
| 4,477,051 | A | 10/1984 | Ben-Yehuda |
| 4,602,654 | A | 7/1986 | Stehling et al. |
| 4,691,726 | A | 9/1987 | Studer et al. |
| 5,159,953 | A | 11/1992 | Sato et al. |
| 5,285,816 | A | 2/1994 | Herlihy |
| 5,355,910 | A | 10/1994 | Gies |
| 5,813,706 | A | 9/1998 | Travis |
| 6,000,473 | A | 12/1999 | Reilly |
| 6,019,398 | A | 2/2000 | Powers |
| 6,050,294 | A | 4/2000 | Makowan |
| 6,152,173 | A | 11/2000 | Makowan |
| 6,227,234 | B1 | 5/2001 | Powers |
| 6,247,489 | B1 | 6/2001 | Maskell et al. |
| 6,360,771 | B2 | 3/2002 | Powers |
| 6,543,474 | B2 | 4/2003 | Fetterman |
| 6,691,732 | B2 | 2/2004 | Fluery et al. |
| 6,782,916 | B2 | 8/2004 | Svendsen et al. |
| 6,868,860 | B2 | 3/2005 | Davidson |
| 6,886,586 | B2 | 5/2005 | Fluery |
| 6,892,752 | B2 | 5/2005 | Burlock et al. |
| 7,004,511 | B2 | 2/2006 | Barron et al. |
| 7,055,544 | B2 | 6/2006 | Davidson |
| 7,104,572 | B1 | 9/2006 | Kane |
| 7,128,091 | B2 | 10/2006 | Istre |
| 7,174,911 | B2 | 2/2007 | Davidson |
| 7,191,666 | B2 | 3/2007 | Parris et al. |
| 7,490,868 | B2 | 2/2009 | Prestridge |
| 7,520,294 | B2 | 4/2009 | German |
| 7,533,693 | B2 | 5/2009 | Colton et al. |
| 7,686,031 | B2 | 3/2010 | German et al. |
| 7,784,489 | B2 | 8/2010 | Paulin |
| 8,733,381 | B2 | 5/2014 | Peyton |
| 9,091,359 | B1 | 7/2015 | Gassaway |
| 9,506,575 | B2 | 11/2016 | Fallon |
| 9,534,359 | B2 | 1/2017 | Peyton |
| 9,752,692 | B2 | 9/2017 | Abouelleil et al. |
| 2003/0121846 | A1 | 7/2003 | Use |
| 2005/0155645 | A1 | 7/2005 | Fredendahl |
| 2006/0016479 | A1 | 1/2006 | Gonzales |
| 2007/0295406 | A1 | 12/2007 | German et al. |
| 2008/0083458 | A1 | 4/2008 | Davidson et al. |
| 2009/0000666 | A1 | 1/2009 | Peyton |
| 2009/0071549 | A1 | 3/2009 | Denike |
| 2010/0132806 | A1 | 6/2010 | Burczynski |
| 2010/0181767 | A1 | 7/2010 | Kozal |
| 2010/0313972 | A1 | 12/2010 | Paulin |
| 2014/0230916 | A1 | 8/2014 | Peyton |
| 2016/0010756 | A1 | 1/2016 | Fallon |
| 2017/0198823 | A1 | 7/2017 | Abouelleil |

OTHER PUBLICATIONS

Peyton, Nicholaus J.; Final Office Action for U.S. Appl. No. 12/144,273, filed Jun. 23, 2008, dated Nov. 30, 2011; 14 pages.
Peyton, Nicholaus J.; Final Office Action for U.S. Appl. No. 12/144,273, filed Jun. 23, 2008, dated Oct. 28, 2013; 23 pgs.
Peyton, Nicholaus J.; Issue Notification for U.S. Appl. No. 12/144,273, filed Jun. 23, 2008, dated May 7, 2014, 1 pg.
Peyton, Nicholaus J.; Non-Final Office Action for U.S. Appl. No. 12/144,273, filed Jun. 23, 2008, dated Jun. 13, 2013; 18 pgs.
Peyton, Nicholaus J.; Non-Final Office Action for U.S. Appl. No. 12/144,273, filed Jun. 23, 2008; dated Jul. 28, 2011; 17 pages.
Peyton, Nicholaus J.; Notice of Allowance for U.S. Appl. No. 12/144,273, filed Jun. 23, 2008, dated Jan. 10, 2014, 5 pgs.
Peyton, Nicholaus J.; Applicant Interview Summary for U.S. Appl. No. 14/259,887, filed Apr. 23, 2014, dated Feb. 8, 2016, 3 pgs.
Peyton, Nicholaus J.; Applicant-Initiated Interview Summary for U.S. Appl. No. 14/259,887, filed Apr. 23, 2014, dated May 24, 2016, 3 pgs.
Peyton, Nicholaus J.; Corrected Notice of Allowability for U.S. Appl. No. 14/259,887, filed Apr. 23, 2014, dated Dec. 5, 2016; 4 pgs.
Peyton, Nicholaus J.; Corrected Notice of Allowance for U.S. Appl. No. 14/259,887, filed Apr. 23, 2014, dated Nov. 2, 2016; 4 pgs.
Peyton, Nicholaus J.; Final Office Action for U.S. Appl. No. 14/259,887, filed Apr. 23, 2014, dated Jan. 27, 2016, 15 pgs.
Peyton, Nicholaus J.; Issue Notification for U.S. Appl. No. 14/259,887, filed Apr. 23, 2014, dated Dec. 14, 2016; 1 pg.
Peyton, Nicholaus J.; Non-Final Office Action for U.S. Appl. No. 14/259,887, filed Apr. 23, 2014, dated Mar. 11, 2016, 18 pgs.
Peyton, Nicholaus J.; Non-Final Office Action for U.S. Appl. No. 14/259,887, filed Apr. 23, 2014, dated May 10, 2016, 25 pgs.
Peyton, Nicholaus J.; Non-Final Office Action for U.S. Appl. No. 14/259,887, filed Apr. 23, 2014, dated Sep. 29, 2015, 32 pgs.
Peyton, Nicholaus; Notice of Allowance for U.S. Appl. No. 14/259,887, filed Apr. 23, 2014, dated Mar. 13, 2016, 11 pgs.
Menyhart, Steven A., Office Action for Application No. 2,635,547 from Canadian Intellectual Property Office, dated Dec. 23, 2010, 4 pages.
Peyton, Nicholaus, J.; Office Action for Application No. 2,635,547 From Canadian Intellectual Property Office, dated Jun. 11, 2012; 2 pgs.
Peyton, Nicholaus, J.; Office Action for Application No. 2,635,547 From Canadian Intellectual Property Office, dated Sep. 8, 2011; 3 pgs.
Peyton, Nicholaus J.; Provisional Patent Application entitled: Anchor Valve for Security, filed Jun. 21, 2007, having U.S. Appl. No. 60/945,464, 20 pages.
Fallon, Timothy Q.; Issue Notification for U.S. Appl. No. 14/326,610, filed Jul. 9, 2014, dated Nov. 9, 2016, 1 pg.
Fallon, Timothy Q.; Non-Final Office Action for U.S. Appl. No. 14/326,610, filed Jul. 9, 2014, dated May 2, 2016, 29 pgs.
Fallon, Timothy Q.; Notice of Allowance for U.S. Appl. No. 14/326,610, filed Jul. 9, 2014, dated Mar. 12, 2016, 8 pgs.
Abouelleil, Ashraf; Non-Final Office Action for U.S. Appl. No. 14/994,741, filed Jan. 13, 2016, dated Jan. 12, 2017, 35 pgs.
Abouelleil, Ashraf; Notice of Allowance for U.S. Appl. No. 14/994,741, filed Jan. 13, 2016, dated May 10, 2017, 9 pgs.
Val-Matic, Swing-Flex Check Valves Brochure, May 2013, 8 pgs.
Val-Matic; "Surgebuster Swing Check Valve, Val-Matic Specification", Jul. 5, 2013, 1 pg.
Val-Matic; Brochure for Surgebuster Check Valves, Copyright 2013, 8 pgs.

(56) References Cited

OTHER PUBLICATIONS

Edward J. Prescott, Inc.; Water, Sewer and Drain Fittings B-10: Ductile Iron Mechanical Joint Fittings, Revised Jun. 2001, 1 pg., Jun. 1, 2001.

CHECK VALVE WITH ACCELERATED CLOSURE

REFERENCE TO RELATED APPLICATIONS

This application is a continuation of U.S. application Ser. No. 14/994,741, filed Jan. 13, 2016, which is hereby specifically incorporated by reference herein in its entirety.

TECHNICAL FIELD

Field of Use

The present invention relates generally to valves and, in particular, to check valves for regulating fluid flow.

Related Art

In a fluid system that transports a fluid from one location to another, it can be desirable to allow the fluid to flow in only one direction. A check valve, a type of valve that allows fluid flow in only one direction, typically includes a disc that is configured to cover an internal opening in the valve to close the valve and to move away from the internal opening to open the valve. When a pump positioned upstream from a check valve in such a fluid system shuts down, any delay between when the pump stops pushing the fluid and when the check valve is fully closed can allow the fluid to flow in reverse. If the fluid beyond the valve is allowed to flow in reverse, the disc can slam closed quickly, creating noise and vibration in the piping system and potentially damaging the disc and other fluid system components upstream from the check valve over long periods of use.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a check valve including a valve body and a flapper assembly, the valve body defining an inlet, an outlet, an interior cavity, and a port in the interior cavity; the flapper assembly movable between an open position, providing fluid communication between the inlet and outlet, and a closed position, isolating the inlet from the outlet, the flapper assembly including a resilient body and a spring assembly, the spring assembly configured to bias the flap portion of the resilient body towards the closed position, the spring assembly including a spring and a backing plate mounted on opposite surfaces of the resilient body and configured to increase the stiffness of the intermediate portion of the resilient body.

In a further aspect, disclosed is a check valve, comprising: a valve body defining an inlet, an outlet and an interior cavity, the valve body further defining a port in the interior cavity that has a circumferential downstream port shoulder surface; and a flapper assembly that is movable between an open position, providing fluid communication between the inlet and outlet, and a closed position, isolating the inlet from the outlet. In one aspect, the flapper assembly comprises: a resilient body extending from a proximal hinge portion to an intermediate portion and to a distal flap portion, the hinge portion configured to be fixedly mounted in the valve body, wherein the intermediate portion and the flap portion have an upstream surface and a downstream surface; and wherein portions of an upstream surface of the flap portion are configured to seal the downstream port shoulder surface of the valve body when the flap portion is in the closed position. In one aspect, the flapper assembly further comprises a spring assembly that is configured to bias the flap portion of the resilient body towards the closed position, the spring assembly comprising: a spring comprising a proximal mounting end that is mounted to a portion of the downstream surface of the intermediate portion of the resilient body and a distal end that is configured to slideably engage portions of the downstream surface of the flap portion; and a backing plate that is mounted to a portion of the upstream surface of the intermediate portion of the resilient body in opposition to the proximal mounting end, wherein the proximate mounting end and the backing plate are configured to increase the stiffness of the intermediate portion of the resilient body relative to the proximal hinge portion and the distal flap portion of the resilient body.

In another aspect, the spring can define a spring step at a transition from the proximal mounting end to the middle portion. In a further aspect, only the bottom portion of the distal end of the spring and a portion of the middle portion of the spring adjacent to the spring step are in contact with the downstream surface of the resilient body.

In yet another aspect, disclosed is a check valve comprising: a valve body defining an inlet, an outlet and an interior cavity, the valve body further defining a port in the interior cavity that has a downstream port shoulder surface; and a flapper assembly that is movable between an open position, providing fluid communication between the inlet and outlet, and a closed position, isolating the inlet from the outlet, the flapper assembly comprising: a resilient body extending from a proximal hinge portion to a distal flap portion, wherein the hinge portion is configured to be fixedly mounted in the valve body, wherein the flap portion has an upstream surface and a downstream surface; and wherein portions of an upstream surface of the flap portion are configured to seal the downstream port shoulder surface of the valve body when the flap portion is in the closed position; and a spring assembly that is configured to bias the flap portion of the resilient body towards the closed position, the spring assembly comprising: a spring comprising a proximal mounting end that is mounted to a portion of the downstream surface of the resilient body, a distal end that is configured to slideably engage portions of the downstream surface of the flap portion, and a middle portion that extends from the proximal mounting end to the distal end, the middle portion being substantially planar when the spring is in a relaxed position; and a backing plate that is mounted to a portion of the upstream surface of the resilient body in opposition to the proximal mounting end; the resilient body positioned between the spring and the backing plate; the spring assembly secured with a plurality of fasteners extending through the backing plate, the resilient body, and the spring; wherein the proximate mounting end and the backing plate are configured to increase the stiffness of the resilient body where the backing plate is mounted.

In yet another aspect, disclosed is a check valve comprising: a valve body defining an inlet and an outlet, the valve body further defining a port between the inlet and outlet that has a downstream port shoulder surface and a recess positioned proximate a portion of the port shoulder surface; and a flapper assembly that is movable between an open position, providing fluid communication between the inlet and outlet, and a closed position, isolating the inlet from the outlet, the flapper assembly comprising: a resilient body extending from a proximal hinge portion to a distal flap portion, wherein the hinge portion is configured to be fixedly mounted in the recess of the valve body, wherein the flap portion has an upstream surface and a downstream surface; and wherein upstream portions of the flap portion are configured to seal the downstream port shoulder surface of the valve body when the flap portion is in the closed position; and a spring assembly that is configured to bias the flap portion of the resilient body towards the closed position, the spring assembly comprising a spring comprising a proximal mounting end that is mounted to a portion of the downstream surface of the resilient body, a distal end having a curved cross sectional shape is which a bottom portion of the curved cross-sectional shape is configured to slideably engage portions of the downstream surface of the flap portion, and a middle portion that extends from the proximal mounting end to the distal end, the middle portion being substantially planar when the spring is in a relaxed position.

In yet another aspect, disclosed is a flapper assembly for a check valve, the check valve having an inlet, an outlet and an interior cavity, the flapper assembly comprising: a resilient body extending from a proximal hinge portion to an intermediate portion and to a distal flap portion, wherein the hinge portion is configured to be fixedly mounted in the interior cavity of the valve body, wherein the intermediate portion and the flap portion have an upstream surface and a downstream surface; and wherein upstream portions of the flap portion are configured to seal the downstream port shoulder surface of the valve body when the flap portion is in a closed position, isolating the inlet from the outlet; and a spring assembly that is configured to bias the flap portion of the resilient body towards the closed position, the spring assembly comprising; a spring comprising a proximal mounting end that is mounted to a portion of the downstream surface of the intermediate portion of the resilient body, a distal end having a curved cross sectional shape in which a bottom portion of the curved cross-sectional shape is configured to slideably engage portions of the downstream surface of the flap portion, and a middle portion that extends from the proximal mounting end to the distal end, the middle portion being substantially planar when the spring is in a relaxed position; and a backing plate that is mounted to a portion of the upstream surface of the intermediate portion of the resilient body in opposition to the proximal mounting end.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain various principles of the invention. Corresponding features and components throughout the figures may be designated by matching reference characters for the sake of consistency and clarity.

DETAILED DESCRIPTION

Figure 1:
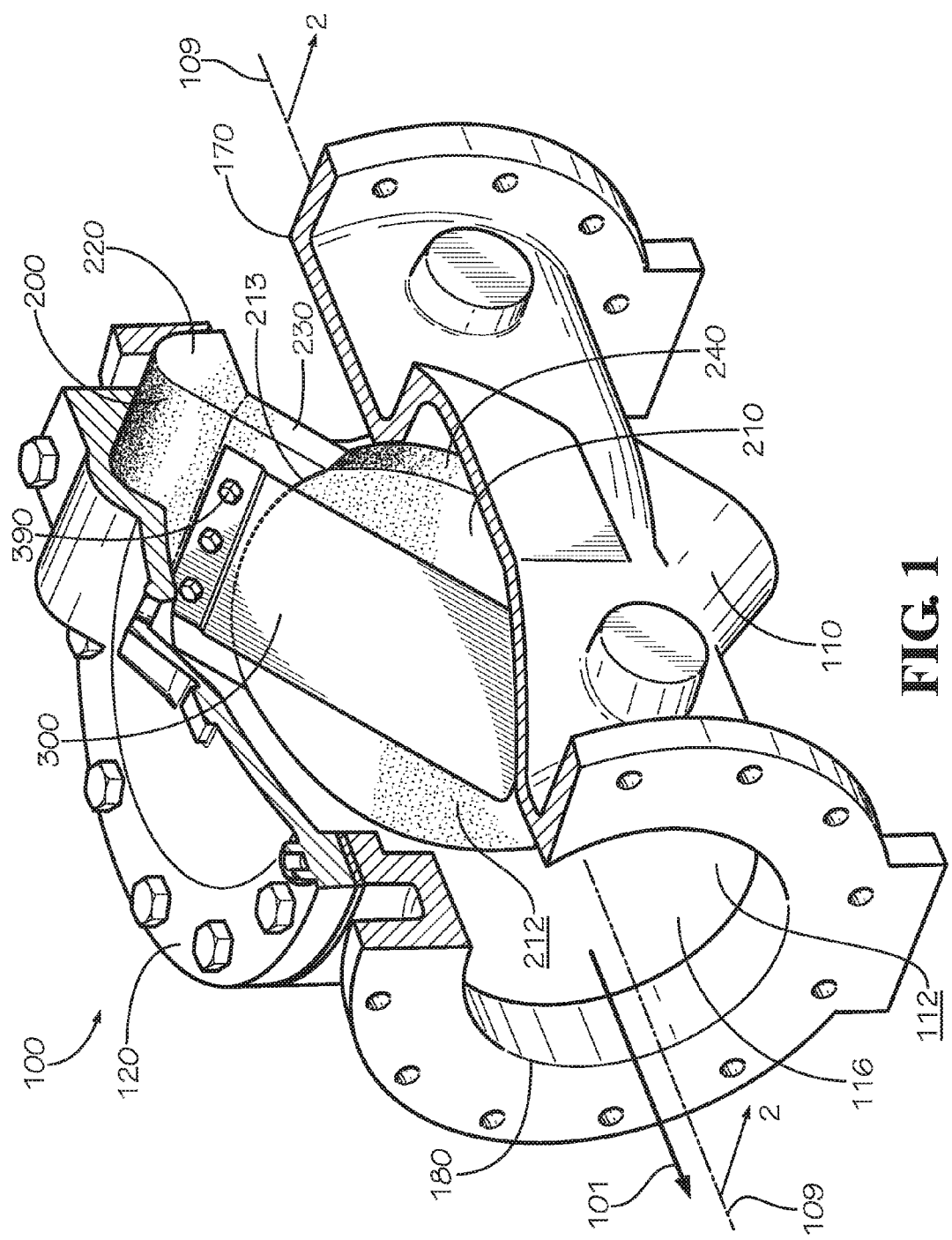
FIG. 1 is perspective cut-away view of a check valve comprising a flapper assembly in accordance with one aspect of the current disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the one aspect of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a check valve and associated methods, systems, devices, and various apparatuses are described herein. The check valve can comprise a flapper assembly comprising a spring. In one aspect, the check valve disclosed herein is, for example and without limitation, a full flow valve in which the flow area is equal to or greater than the equivalent pipe size throughout. In another aspect, the check valve disclosed herein complies with the requirements ANSI/AWWA C508 including the 1,000,000 cycle-test requirement.

Various materials can be used to fabricate the various components of the check valve 100. The disclosure of the specific materials or finishes or types of materials or finishes listed, however, is not intended to be limiting on the current disclosure. One of ordinary skill in the art would know to substitute equivalent materials where appropriate.

Figure 2:
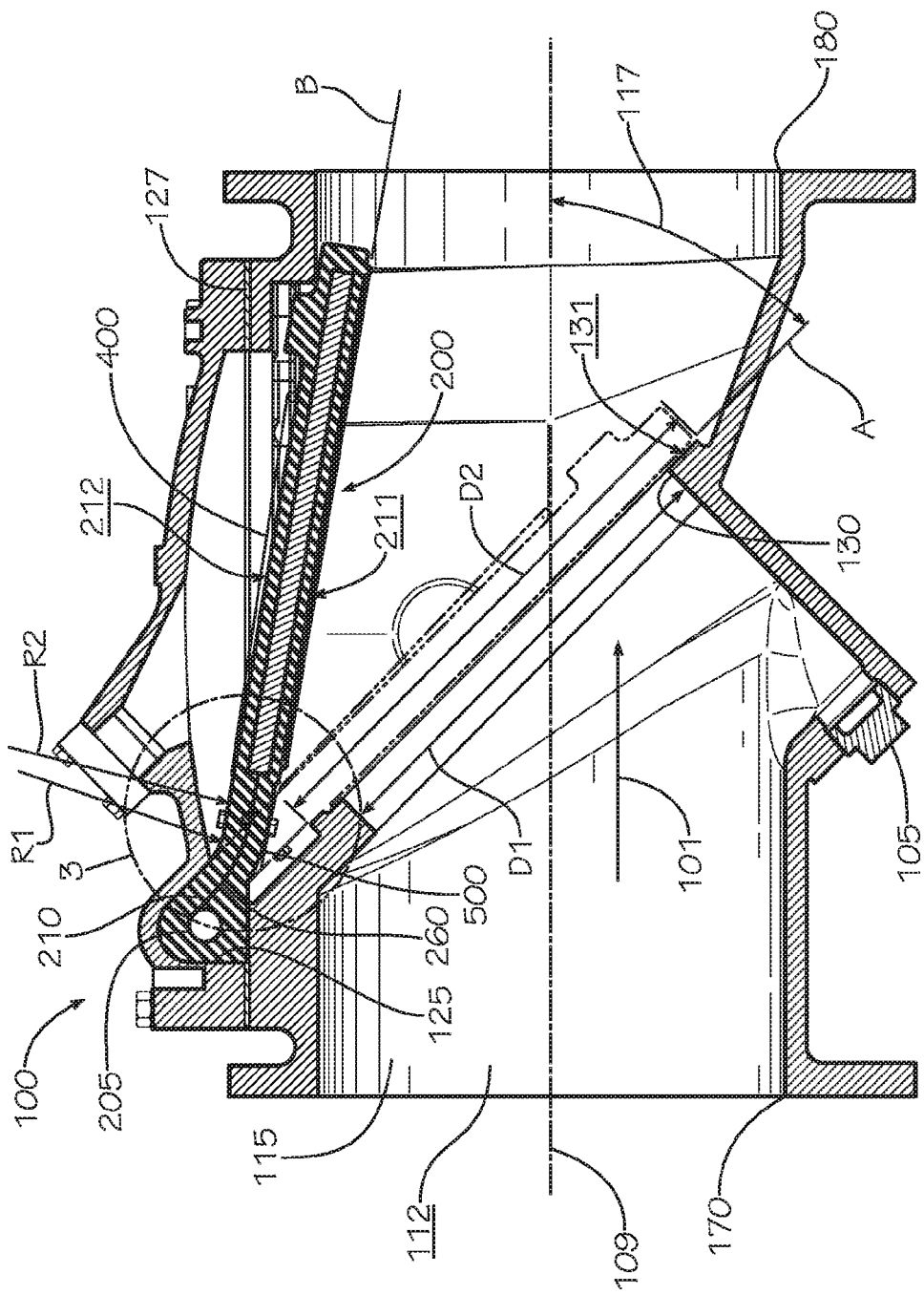
FIG. 2 is a sectional view of the check valve of FIG. 1 taken along line 2-2 of FIG. 1 in accordance with another aspect of the current disclosure wherein the flapper assembly includes a hinge pin.

In one aspect, as shown in FIGS. 1 and 2, a check valve 100 comprises a valve body 110 and a flapper assembly 200, which can also be described as a check valve disc assembly and defines a primary flow direction 101. The valve body 110 defines an inlet 170, an outlet 180, an outer surface, and an interior cavity 116 defining an inner surface 112. The inner surface 112 can be coated with an epoxy film or other coating to prevent the fluid in the valve from contacting the material used to form the valve body 110. As shown in FIG. 2, the valve body defines a port 130 in the interior cavity 116 that has a circumferential downstream port shoulder surface 131. An inside diameter D1 and an outside diameter D2 are shown defined by the port shoulder surface 131 of the port 130 of the valve body 110. The valve body 110 can comprise an inlet flange defining mounting hole bores and an outlet flange defining mounting hole bores. The check valve 100 can further comprise an access plug 105 so that any fluid inside the check valve 100 can be drained out, so that an external backflow device can be installed to manually open the flapper assembly, or so that the interior cavity 116 can be otherwise accessed.

Optionally, the valve body 110 can comprise a valve cover 120 that is separate from a main portion 115 of the valve body 110 and attached to the main portion 115 with a plurality of fasteners. The valve cover 120 comprises an outer surface, an inner surface, a boss, a boss cover, and a plurality of mounting fasteners. The valve cover 120 defines a plurality of mounting hole bores for mounting the boss cover with a plurality of boss cover fasteners. The boss cover may be replaced with a mechanical position indicator (not shown) or other device and may be removed to allow access to the interior of the check valve 100. Furthermore, the boss, boss cover, and boss cover fasteners may not be present on the valve cover 120.

Optionally, a gasket 127 is positioned between the main portion 115 and the valve cover 120 and facilitates a tight seal between the main portion 115 and the valve cover 120. The gasket 127 may define holes (not shown) to provide clearance for fasteners. The gasket 127 may additionally define holes that provide clearance for movement of parts of a valve position indicator (not shown), which in some installations is mounted to the boss of the valve cover 120. The valve position indicator indicates the position of the flapper assembly 200 of the check valve 100—whether the check valve 100 is open or closed or somewhere in between. The gasket 127 can be made from a rubber such as, for example and without limitation, Buna-N rubber (i.e., nitrile), ethylene propylene diene (EPDM) rubber, or silicone.

Components of the check valve including the valve body 110, the access plug 105, and the boss cover can be made from, for example and without limitation, ductile iron or an equivalently suitable iron material. The valve body 110, boss cover, or the access plug 105 can also be made from another material or a combination of other materials including copper, bronze, steel, plastic (including fiber-reinforced plastic), or an equivalently suitable material.

Optionally, the valve body 110 further comprises a recess 125 positioned proximate to a portion of the port shoulder surface 131 in which the hinge portion 220 of the resilient body 210 is configured to be fixedly mounted. As shown in FIGS. 1 and 2, the valve body 110 extends along a longitudinal axis 109 of the valve body 110 between the inlet 170 and the outlet 180. The port shoulder surface 131 can be angled with respect to the longitudinal axis 109 by an angle 117 measuring between 0 and 180 degrees. For example and without limitation, the angle 117 can be about 45 degrees. Where the port shoulder surface 131 is angled with respect to the longitudinal axis 109 by the angle 117, the recess 125 can be positioned upstream from the port shoulder surface 131.

The flapper assembly 200 is shown in solid lines in FIG. 2 in an open position B and is shown in broken lines in FIG. 2 in a closed position A. The flapper assembly 200 comprises a resilient body 210, which can also be described as a disc flapper or a flapper disc, and a spring assembly 300. The resilient body 210 can be a monolithic body including a proximal hinge portion 220, an intermediate portion 230, and a distal flap portion 240. The resilient body 210 extends from the proximal hinge portion 220 to the intermediate portion 230 to the distal flap portion 240. The hinge portion 220 is configured to be fixedly mounted in the valve body 110. The intermediate portion 230 and the flap portion 240 together define an upstream surface 211 and a downstream surface 212. The intermediate portion 230 defines an upstream surface 231 and a downstream surface 232 and the flap portion 240 defines an upstream surface 241 and a downstream surface 242. The upstream surface 211 can include the upstream surfaces 231 and 241 and the downstream surface 212 can include the downstream surfaces 232 and 242. As shown, the flap portion 240 can be, for example and without limitation, disc-shaped (i.e., substantially round or circular in shape and having a thickness). The flap portion 240 as well as the resilient body 210 overall can be fabricated from a polymeric material such as, for example and without limitation, Buna-N (i.e., nitrile), ethylene propylene diene (EPDM) rubber, and other resilient materials. The process used to form the resilient body 210 can be a molding process such as, for example and without limitation, an injection molding process.

Optionally, the flapper assembly 200 includes a hinge pin 205 and a stiffening insert 250 wrapped with a reinforcement strap 260 and encapsulated within the resilient body 210. The hinge pin 205 can help the hinge portion 220 of the resilient body 210 keep its shape when sandwiched between the valve body 110 and the cover 130, while the stiffening insert 250 can help keep the flap portion 240 flat under pressure. The reinforcement strap 260 couples the stiffening insert 250 to the hinge pin 205 and wraps at least partially around the stiffening insert 250 and the hinge pin 205. As shown in FIG. 1, however, the flapper assembly 200 may not include the hinge pin 205, the stiffening insert 250, or the reinforcement strap 260. The stiffening insert 250 and the hinge pin 205 can be made from a steel such as, for example and without limitation, hot-rolled steel. The stiffening insert 250 or the hinge pin 205 can also be made from another metal, a polymer, or any rigid material or from a combination of two or more of these materials. For example and without limitation, the reinforcement strap 260 can be made from a cloth such as fiberglass cloth or from a nylon material or other flexible material having similar mechanical properties. The reinforcement strap 260 can also be made from another material or combination of materials with a tensile strength and other properties resulting in the reinforcement strap 260 being able to prevent resilient body 210 from stretching or deforming over time.

Figure 3:
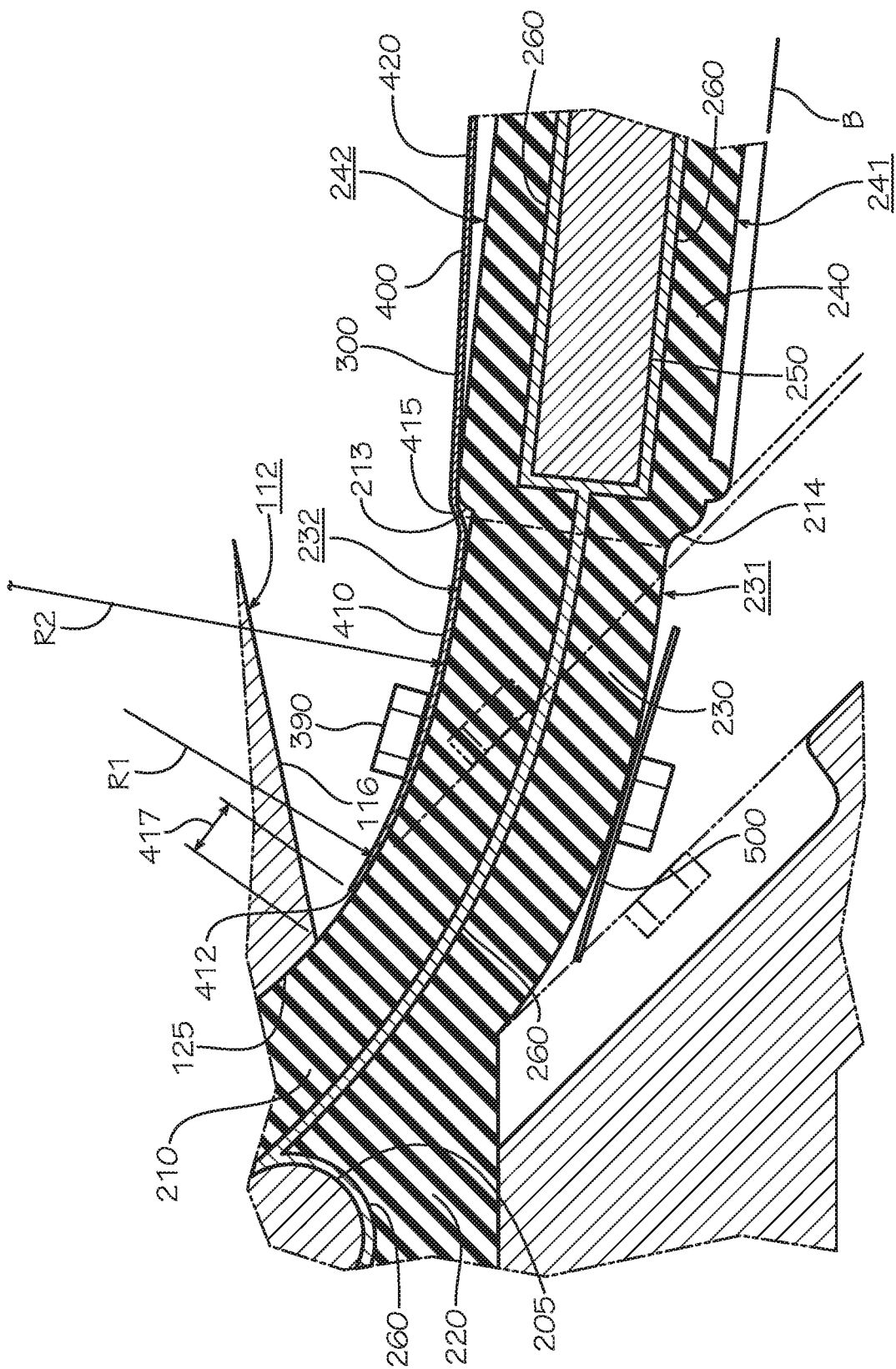
FIG. 3 is a detail view of the check valve of FIG. 2 taken from detail 3 of FIG. 2.
Figure 4:
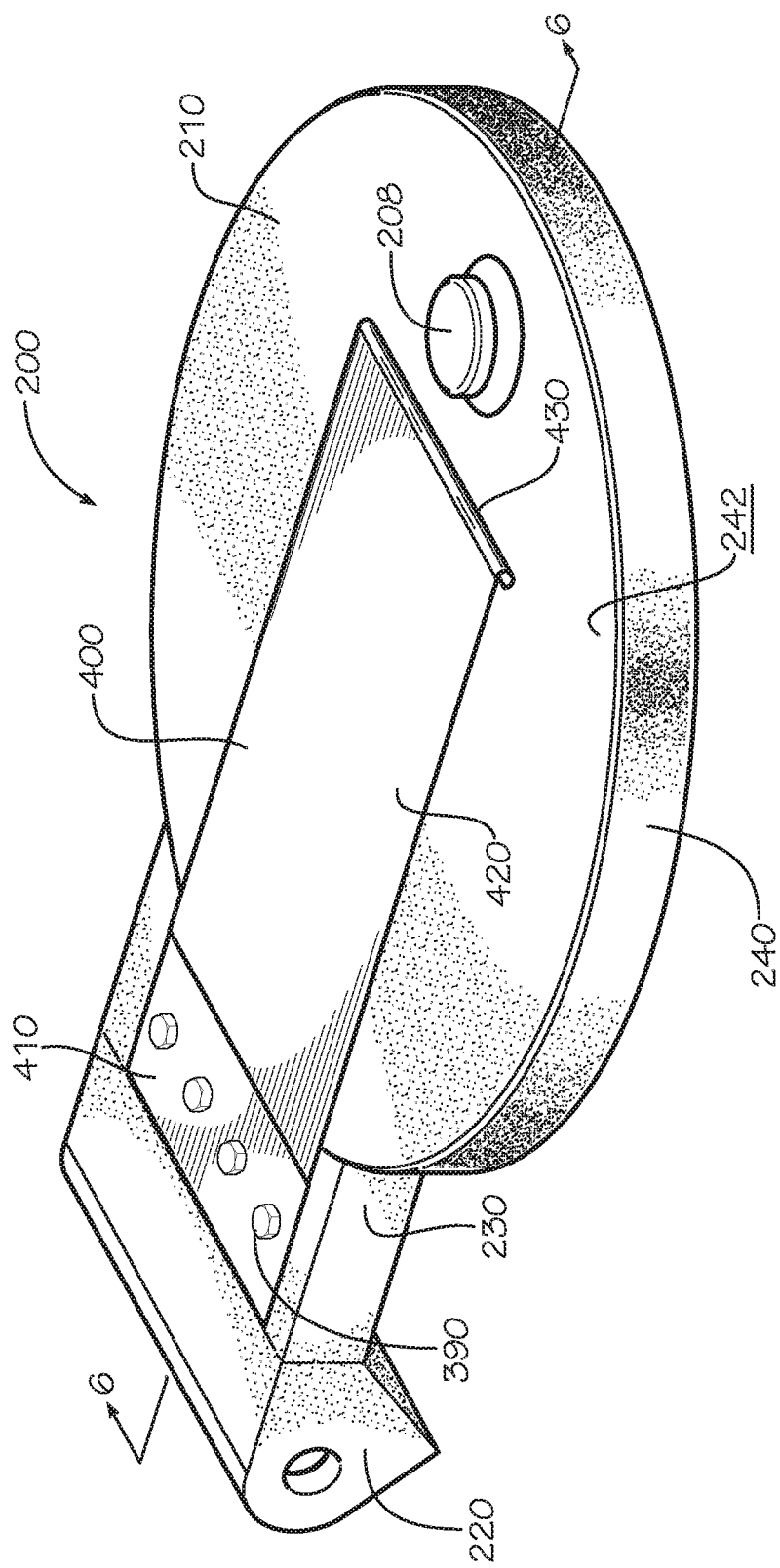
FIG. 4 is a perspective view of the flapper assembly of FIG. 2.
Figure 8:
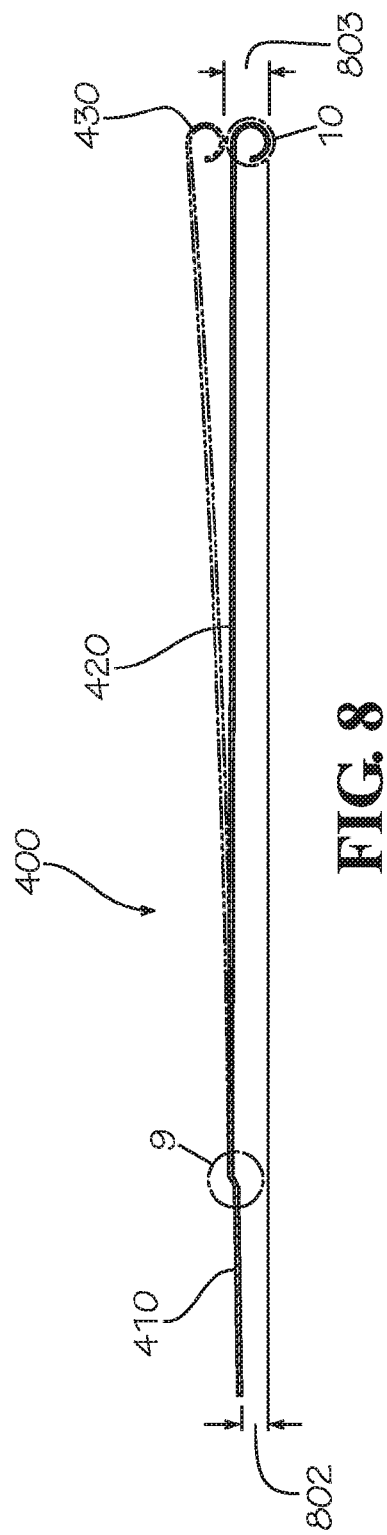
FIG. 8 is a sectional view of a spring of a spring assembly of the flapper assembly of FIG. 2 taken from FIG. 6 wherein the spring is shown in a slightly flexed position of FIG. 6 and in a relaxed position.

The spring assembly 300 comprises a spring 400 including a proximal mounting end 410 and a distal end 430. As shown in FIGS. 3 and 4, the proximal mounting end 410 of the spring 400 is mounted to a portion of the downstream surface 232 of the intermediate portion 230 of the resilient body 210. As shown in FIG. 8, the proximal mounting end 410 of the spring 400 is substantially planar when the spring 400 is in a relaxed position or in a slightly flexed position. The distal end is configured to slideably engage portions of the downstream surface 242 of the flap portion 240. The spring 400 further comprises a middle portion 420—that can be planar in various aspects—that extends from the proximal mounting end 410 to the distal end 430. Optionally, the spring 400 defines a spring step 415 at a transition from the proximal mounting end 410 to the middle portion 420. As shown, the spring 400 is disposed entirely within the interior cavity 116 of the valve body 110 and does not contact the recess 125. In one aspect, a terminal edge 412 of the proximal mounting end 410 of the spring 400 is offset from the interior surface 112 of the valve body 110 by a distance approximately equal to an offset distance 417.

Figure 5:
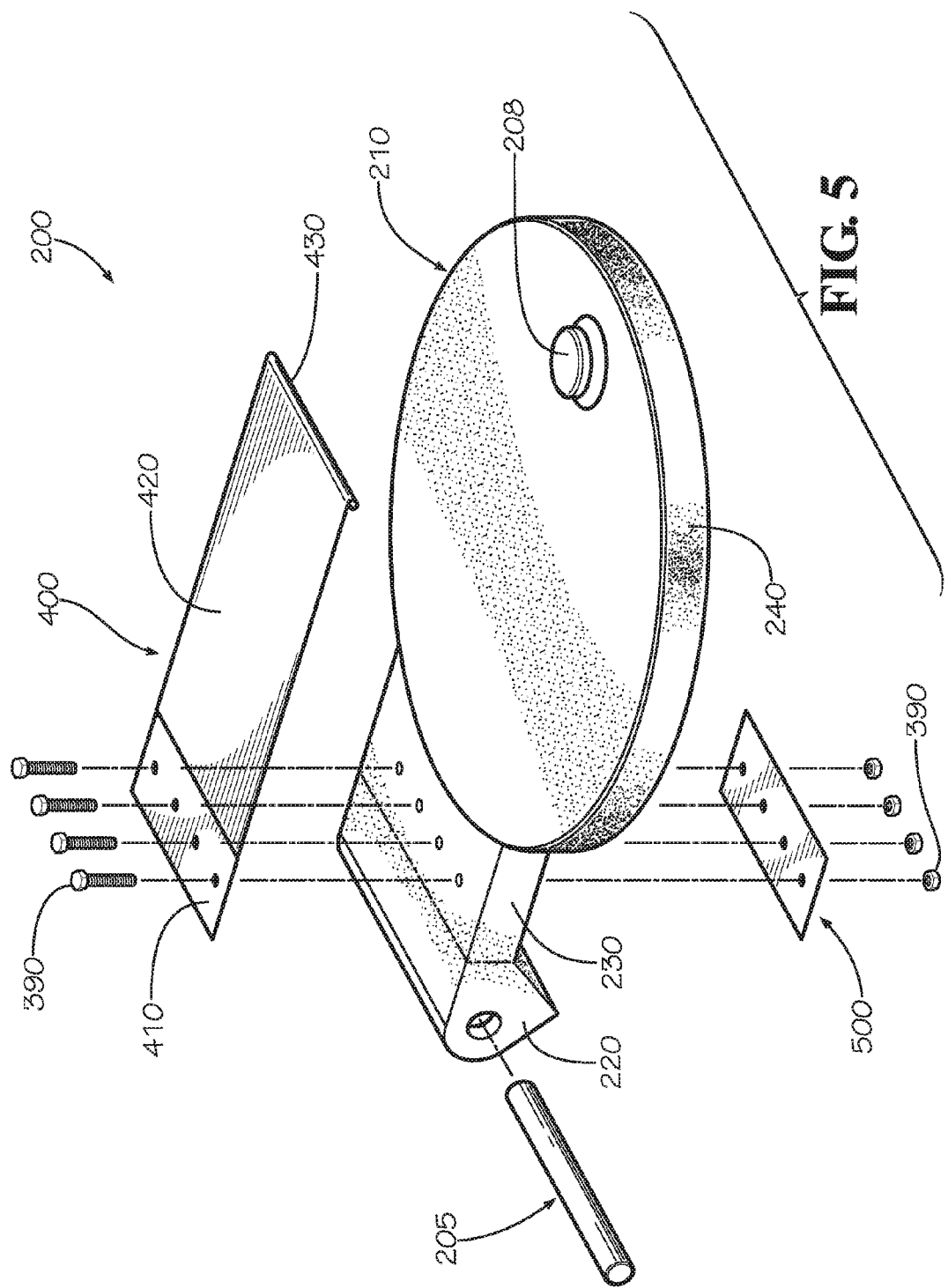
FIG. 5 is an exploded view of the flapper assembly of FIG. 2.

In one aspect, the spring assembly 300 also comprises a backing plate 500. As shown in FIG. 5, the backing plate 500 is substantially planar, although the backing plate 500 can also be of another shape. The backing plate 500 can be a single plate or can comprise a plurality of separate plates that differ in size and proportions from that shown. The backing plate 500 can define any straight-sided or rounded shape such as, for example and without limitation, a rectangle or a circle, that is mountable to the intermediate portion 230 of the resilient body 210. The backing plate 500 can, for example and without limitation, comprise washers. Optionally, a length and a width of the backing plate are dimensionally similar to a length and a width of the proximal mounting end 410 of the spring 400. By being dimensionally similar, the length and the width dimensions of the backing plate 500 are about equal to the length and width dimensions of the proximal mounting end 410 of the spring 400. As shown, the backing plate 500 can be mounted to a portion of the upstream surface 231 of the intermediate portion 230 of the resilient body 210 opposite the proximal mounting end 410 of the spring 400, wherein the proximate mounting end 410 and the backing plate 500 are configured to selectively increase the stiffness of the intermediate portion 230 of the resilient body 210 relative to the proximal hinge portion 220 and the distal flap portion 240 of the resilient body 210.

In one aspect, the check valve 100 further comprises a plurality of fasteners 390, wherein the intermediate portion 230 of the resilient body 210, the proximal mounting end 410 of the spring 400, and the backing plate 500 each define a plurality of openings, and wherein the respective openings in the intermediate portion 230 of the resilient body 210, the proximal mounting end 410, and the backing plate 500 are coaxially aligned and are configured to operatively receive the plurality of fasteners 390 to fixedly mount the proximal mounting end 410 of the spring 400 and the backing plate 500 to the intermediate portion 230 of the resilient body 210. As shown in FIG. 1, a total of three fasteners 390 may be used in the flapper assembly 200. As shown in FIG. 4, a total of four fasteners 390 may be used in the flapper assembly 200. The number of fasteners 390 may be as few as zero—if another fastening method is used—or may be greater than four.

FIGS. 3 through 6 additionally disclose the flapper assembly 200. Optionally, the flapper assembly 200 comprises a stopper 208 that can be formed in the resilient body 210. The resilient body 210 is shown comprising the hinge portion 220, the intermediate portion 230, and the flap portion 240. As shown, the hinge portion 220 comprises the hinge pin 205. The hinge portion 220 of the flapper assembly 200, however, need not rotate about the hinge pin 205 to be considered a hinge portion. In addition, neither the hinge portion 220 nor the hinge pin 205 need to rotate with respect to the valve body 110 during operation. The hinge portion 220 of the flapper assembly 200 can be shaped so as to fill and remain stationary inside the recess 125 of the valve body 110.

Figure 6:
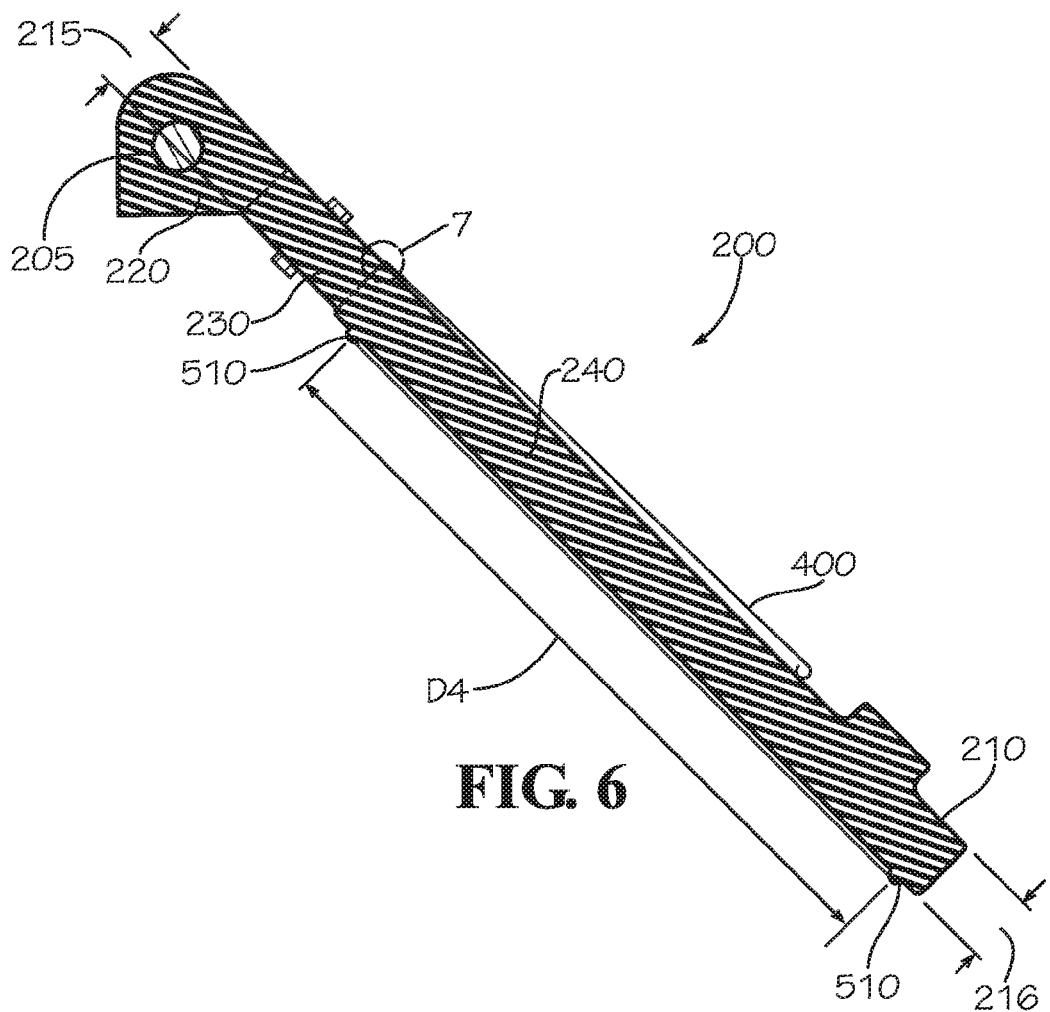
FIG. 6 is a sectional view of the flapper assembly of FIG. 2 taken along line 6-6 of FIG. 4.
Figure 7:
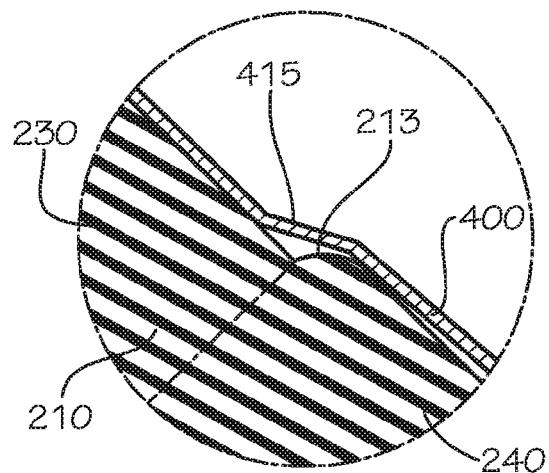
FIG. 7 is a detail view of the flapper assembly of FIG. 2 taken from detail 7 of FIG. 6.

FIGS. 6 and 7 show the flapper assembly 200. As shown in FIG. 6, the intermediate portion 230 of the resilient body 210 has a first cross-sectional thickness 215, and the flap portion 240 of the resilient body 210 has a second cross-sectional thickness 216 that is greater than the first cross-sectional thickness 215. The intermediate portion 230 and the flap portion 240 of the resilient body 210, however, can also have the same cross-section thickness. As shown in FIG. 7, the spring step 415 can be formed to substantially overlie a first step 213 that is formed in the downstream surface 212 of the resilient body 210 at a transition from the intermediate portion 230 to the flap portion 240. Optionally, the upstream surface 211 of the resilient body 210 can define a second step 214 at a transition from the intermediate portion 230 to the flap portion 240.

Optionally, as shown in FIG. 6, the resilient body 210 of the flapper assembly 200 comprises a sealing portion 510, which can be an O-ring in one aspect. As shown, the sealing portion 510 is formed as part of the resilient body 210 to ensure a tight seal between the resilient body 210 and the port shoulder surface 131. The sealing portion 510 has a diameter D4 measuring a value between the values of the diameter D1 and the diameter D2 of the port shoulder surface 131.

Figure 10:
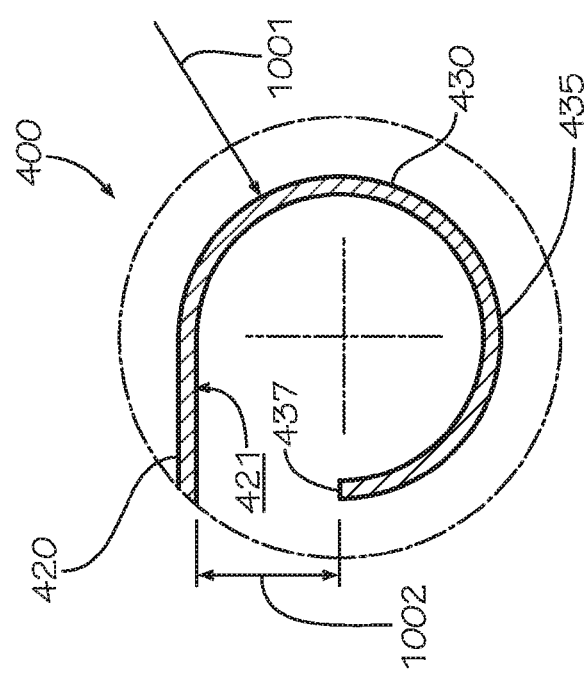
FIG. 10 is a detail view of the spring of FIG. 8 taken from detail 10 of FIG. 8.
Figure 9:
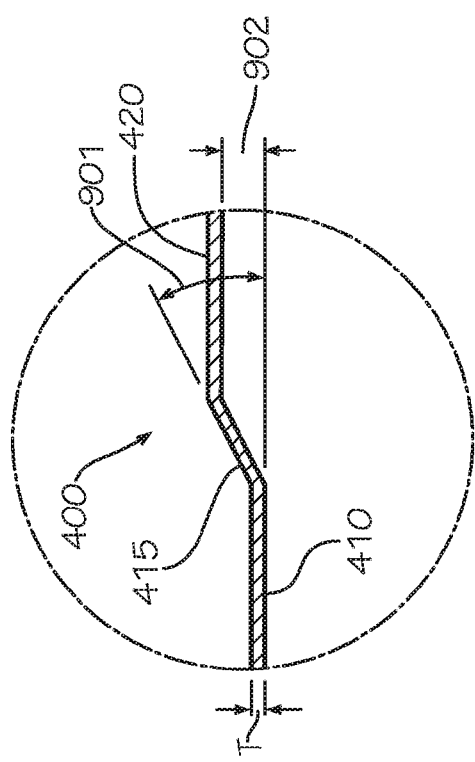
FIG. 9 is a detail view of the spring of FIG. 8 taken from detail 9 of FIG. 8.

FIGS. 8-10 disclose additional features of the spring 400. As shown in FIG. 8, the spring 400 defines an mount offset distance 802 and a presprung distance 803. The mount offset distance 802 is the distance between a mounting surface of the proximal mounting end 410 and a bottom portion 435 of the distal end 430. The presprung distance 803 is the distance between the bottom portion 435 when the spring 400 is in a relaxed state shown in solid lines and the bottom portion 435 when the spring 400 is in a presprung state shown in broken lines (i.e., as installed in the flapper assembly 200 when the flapper assembly 200 is in the closed position A inside the check valve 100). As shown, the presprung distance 803 is approximately equal to a diameter (i.e., twice a radius 1001 shown in FIG. 10) of a curved cross-sectional shape at the distal end 430 of the spring 400. As shown in FIG. 9, the spring step 415 defines a spring thickness T measuring approximately 0.020 inches (0.5 millimeters), a step angle 901 measuring approximately 30 degrees and a step distance 902 approximately equal to a height of the first step 213 of the resilient body 210. Optionally, the step angle 901 can measure more or less than 30 degrees, and the spring thickness T can measure more or less than 0.020 inches.

In one aspect, as shown in FIG. 10, the distal end 430 of the spring 400 comprises a curved cross-sectional shape with the bottom portion 435 having the outside radius 1001 and defining a clearance gap 1002 between an upstream surface 421 of the middle portion 420 of the spring 400 and a terminal end 437 of the spring 400. The bottom portion 435 of the distal end 430 is configured to slideably engage portions of the downstream surface 232 of the flap portion 240 and to space at least a portion of the middle portion 420 of the spring 400 away from the downstream surface 232 of the flap portion 240. Additionally, the curved cross-sectional shape—which can also be described as a loop in the spring 400 at the distal end 430—allows smooth slideable engagement of the distal end 430 of the spring 400 with the downstream surface 232 of the flap portion 240. Optionally, the spring 400 can be shaped so that only the bottom portion 435 of the distal end 430 of the spring 400 and a portion of the middle portion 420 of the spring 400 adjacent to the spring step 415 are in contact with the downstream surface 212 of the resilient body 210. In another aspect, it is contemplated that the spring can be shaped to contact the flap portion 240 along the entire length of the flap portion 240.

A material such as used to form the spring 400 or the resilient body 210 exhibits a variety of mechanical properties including a modulus of elasticity or Young's modulus. As shown, the spring 400 is made from a non-elastomeric material and the resilient body 210 is made from an elastomeric material, where an elastomeric material is a material having a relatively low Young's modulus that is generally adapted to expand, contract, compress, or stretch under normal operating conditions to a degree that is visible by the naked eye. An elastomeric material such as rubber has a Young's modulus of 15,000 psi (approximately 0.1 GPa), which is about three orders of magnitude below the Young's modulus of one of the weaker materials used for springs such as phosphor bronze. The spring 400 can be formed from a material having a modulus of elasticity in tension equal to that of phosphor bronze or at least about 15,000,000 psi (approximately 103 GPa). More specifically, the spring 400 can be formed from a material having a modulus of elasticity in tension of about 28,000,000 psi (approximately 193 GPa). Optionally, the spring 400 can be formed from an AISI 301 series cold-drawn stainless steel meeting the requirements of ASTM A666 or the equivalent specification (e.g., UNS S30100, SAE J230, and QQ-S-766). As shown, the spring 400 is formed from a material having a modulus of elasticity that is greater than the modulus of elasticity of the material that forms the resilient body 210.

The spring 300 and the backing plate 500 can be formed from a flat blank of raw material using one or more material removal processes such as, for example and without limitation, machining, stamping, punching, laser-cutting, abrasive-water-jet-cutting, and chemical milling or etching, optionally in combination with forming processes such as, for example and without limitation, casting, forging, stamping, bending, and three-dimensional printing.

The flapper assembly 200 can be installed in a check valve of potentially any size from a check valve having a 2" inside diameter to a check valve having a 24" inside diameter. The check valve utilizing the flapper assembly 200, however, can optionally be outside of this range (i.e., the check valve can have an inside diameter smaller than 2" or greater than 24").

The spring assembly 300 is configured to bias the flap portion 240 of the resilient body 210 towards the closed position A. When the spring 400 is pre-sprung to a presprung distance 803, the spring assembly 300 is able to apply a force to the flap portion 240 of the resilient body 210 even when the flapper assembly 200 is in the closed position A to facilitate a positive seal against the downstream port surface 131. In other words, the presprung distance 803 gives initial stiffness or memory to the spring 300 when installed on the flapper assembly 200. The length and width, thickness, or material specification of the spring 400 and various other characteristics of the spring assembly 300 and the flapper assembly 200 including the quantity of the springs 400 assembled to a single flapper assembly 200 can be adjusted to increase or decrease the stiffness of the flapper assembly 200 and thus increase or decrease the speed at which the flapper assembly 200 closes inside the check valve 100.

For example and without limitation, each of the fasteners 390 can be tightened until the spring 400 and the backing plate 500 are respectively snug (i.e., held flush) against the upstream surface 231 and the downstream surface 232 of the intermediate portion 230 of the resilient body 210. Optionally, each of the fasteners 390 can be additionally tightened past this point by one turn or 360 degrees. None of the fasteners 390, however, are tightened so much that the proximal mounting end 410 or the backing plate 500 is damaged. Optionally, the fastening torque used to install the fasteners 390 can be adjusted to increase or decrease the stiffness of the flapper assembly 200 and thus the speed at which the flapper assembly 200 closes inside the check valve 100.

The flapper assembly 200 is selectively movable about and between the open position B, providing fluid communication between the inlet 170 and the outlet 180, and the closed position A, isolating the inlet 170 from the outlet 180. The flapper assembly 200, however, can be made to stop at any point between the closed position A and the open position B by incorporating, for example and without limitation, a mechanical stop such as an external backflow device (not shown) installed through the valve body 110, or simply by variation of the pressure of the fluid inside the valve. For purposes of describing the present disclosure, the check valve 100 is in the closed position A when the flapper assembly 200 is in contact with the port shoulder surface 131. In contrast, the check valve 100 is in an open position when the flapper assembly 200 is not in contact with the port shoulder surface 131. When the flapper assembly 200 is in contact with the inner surface 112 of the valve body 110, it can be said that the flapper assembly 200 is fully open. This fully open check valve position is shown in FIG. 2 as the open position B.

When the flapper assembly 200 is fully open, the proximal mounting end 410 of the spring 400 is made to flex together with the intermediate portion 230 of the resilient body 210. As shown in FIGS. 2 and 3, the intermediate portion 230 of the flapper assembly 200 defines a radius R1 between the fastener 390 and the recess 125 and a radius R2 between the fastener 390 and the flap portion 230. The radius R2 may measure greater than the radius R1. The radius R2 may measure several times the radius R1.

Upstream portions of the upstream surface 231 of the flap portion 240 are configured to selectively seal the downstream port shoulder surface 131 of the valve body 110 when the flap portion 240 is in the closed position A. For example, the inlet surface 212 may form a substantially fluid-tight seal with the disc sealing surface 184 of the check valve 100 when the flap portion 240 is in the closed position A.

The reinforcement strap 260 can increase the long-term strength or life of the flapper assembly 200. The life of the flapper assembly 200 can be increased, especially on larger check valves, by using the reinforcement strap 260 to carry at least some of the mechanical loads experienced by the resilient body 210 during repeated open and close cycles.

In one aspect, a method of manufacturing the flapper assembly 200 comprises drilling holes in the intermediate portion of the resilient body 210 to receive the fasteners 390, positioning the proximal mounting end 410 and the backing plate 500 on opposite surfaces of the flapper assembly 200, and securing the spring assembly 300 to the resilient body 210 with the fasteners 390. This method of manufacturing the flapper assembly 200 can be used to retrofit a flapper assembly not originally containing certain features disclosed herein.

In one aspect, a method of using the check valve 100 comprises opening the flapper assembly 200 with the pressure of a fluid traveling within the check valve 100 and then closing the flapper assembly 200 with the aid of the spring assembly 300 disclosed herein. The method of using the check valve 100 can further comprise closing the flapper assembly 200 before reverse flow is established inside the check valve 100 sufficient to cause water hammer.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A check valve, comprising:
   a valve body defining an inlet, an outlet and an interior cavity, the valve body further defining a port in the interior cavity that has a downstream port shoulder surface; and
   a flapper assembly that is movable between an open position, providing fluid communication between the inlet and outlet, and a closed position, isolating the inlet from the outlet, the flapper assembly comprising:
      a resilient body extending from a proximal hinge portion to a distal flap portion, wherein the hinge portion is configured to be fixedly mounted in the valve body, wherein the flap portion has an upstream surface and a downstream surface; and wherein portions of an upstream surface of the flap portion are configured to seal the downstream port shoulder surface of the valve body when the flap portion is in the closed position; and
      a spring assembly that is configured to bias the flap portion of the resilient body towards the closed position, the spring assembly comprising:
         a spring comprising a proximal mounting end that is mounted to a portion of the downstream surface of the resilient body, a distal end that is configured to slideably engage portions of the downstream surface of the flap portion, and a middle portion that extends from the proximal mounting end to the distal end, the middle portion being substantially planar when the spring is in a relaxed position; and
         a backing plate that is mounted to a portion of the upstream surface of the resilient body in opposition to the proximal mounting end; the resilient body positioned between the spring and the backing plate; the spring assembly secured with a plurality of fasteners extending through the backing plate, the resilient body, and the spring; wherein the proximate mounting end and the backing plate are configured to increase the stiffness of the resilient body where the backing plate is mounted.

2. The check valve of claim 1, wherein the valve body further comprises a recess positioned proximate a portion of the port shoulder surface, and wherein the hinge portion of the resilient body is configured to be fixedly mounted in the recess of the valve body.

3. The check valve of claim 1, wherein the valve body extends along a longitudinal axis of the valve body between the inlet and the outlet and wherein the port shoulder surface is angled with respect to the longitudinal axis.

4. The check valve of claim 1, wherein the backing plate and the proximal mounting end of the spring are substantially planar.

5. The check valve of claim 1, wherein the proximal mounting end of the spring and the backing plate each define a plurality of openings, and wherein the respective openings in the intermediate portion of the resilient body, the proximal mounting end of the spring, and the backing plate are coaxially aligned and are configured to operatively receive the plurality of fasteners to fixedly mount the proximal mounting end of the spring and the backing plate to the intermediate portion of the resilient body.

6. The check valve of claim 1, wherein the middle portion is substantially planar.

7. The check valve of claim 6, wherein only the bottom portion of the distal end of the spring and a portion of the middle portion of the spring adjacent to a spring step of the spring are in contact with the downstream surface of the flap portion of the resilient body.

8. The check valve of claim 6, wherein the downstream surface of the resilient body defines a first step at a transition from the intermediate portion to the flap portion.

9. The check valve of claim 8, wherein the upstream surface of the resilient body defines a second step at a transition from the intermediate portion to the flap portion.

10. The check valve of claim 8, wherein the spring defines a spring step at a transition from the proximal mounting end to the middle portion and wherein the spring step substantially overlies the first step formed in the downstream surface of the resilient body.

11. The check valve of claim 1, wherein the distal end of the spring comprises a curved cross sectional shape in which a bottom portion of the curved cross-sectional shape is configured to slideably engage portions of the downstream surface of the flap portion and to space the majority of the middle portion of the spring away from the downstream surface of the flap portion.

12. The check valve of claim 1, wherein the flap portion is disc-shaped.

13. A check valve, comprising:
a valve body defining an inlet and an outlet, the valve body further defining a port between the inlet and outlet that has a downstream port shoulder surface and a recess positioned proximate a portion of the port shoulder surface; and
a flapper assembly that is movable between an open position, providing fluid communication between the inlet and outlet, and a closed position, isolating the inlet from the outlet, the flapper assembly comprising:
a resilient body extending from a proximal hinge portion to a distal flap portion, wherein the hinge portion is configured to be fixedly mounted in the recess of the valve body, wherein the resilient body has an upstream surface and a downstream surface; and wherein upstream portions of the flap portion are configured to seal the downstream port shoulder surface of the valve body when the flap portion is in the closed position; and
a spring assembly that is configured to bias the flap portion of the resilient body towards the closed position, the spring assembly comprising
a spring comprising a proximal mounting end that is mounted to a portion of the downstream surface of the resilient body, a distal end having a curved cross sectional shape in which a bottom portion of the curved cross-sectional shape is configured to slideably engage portions of the downstream surface of the flap portion, and a middle portion that extends from the proximal mounting end to the distal end, the middle portion being substantially planar when the spring is in a relaxed position, wherein the proximal mounting end is substantially planar, and
a backing plate that is mounted to a portion of the upstream surface of the resilient body in opposition to the proximal mounting end, wherein the proximate mounting end and the backing plate are configured to increase the stiffness of a portion of the resilient body relative to the proximal hinge portion and the distal flap portion of the resilient body, wherein the backing plate is substantially planar and wherein the backing plate is dimensionally similar to the proximal mounting end of the resilient body.

14. The check valve of claim 13, wherein the port shoulder surface is angled with respect to a longitudinal axis of the valve body.

15. The check valve of claim 13, further comprising a plurality of fasteners, wherein the intermediate portion of the resilient body, the proximal mounting end and the backing plate each define a plurality of openings, and wherein the respective openings in the intermediate portion of the resilient body, the proximal mounting end and the backing plate are coaxially aligned and are configured to operatively receive the plurality of fasteners to fixedly mount the proximal mounting end of the spring and the backing plate to the intermediate portion of the resilient body, and wherein the downstream surface of the resilient body defines a first step at a transition from the intermediate portion to the flap portion.

16. The check valve of claim 15, wherein the upstream surface of the resilient body defines a second step at a transition from the intermediate portion to the flap portion.

17. The check valve of claim 15, wherein the spring defines a spring step at a transition from the proximal mounting end to the middle portion and wherein the spring step substantially overlies the first step formed in the downstream surface of the resilient body.

18. A flapper assembly for a check valve, the check valve having an inlet, an outlet and an interior cavity, the flapper assembly comprising:
a resilient body extending from a proximal hinge portion to an intermediate portion and to a distal flap portion, wherein the hinge portion is configured to be fixedly mounted in the interior cavity of the valve body, wherein the intermediate portion and the flap portion have an upstream surface and a downstream surface; and wherein upstream portions of the flap portion are configured to seal the downstream port shoulder surface of the valve body when the flap portion is in a closed position, isolating the inlet from the outlet; and
a spring assembly that is configured to bias the flap portion of the resilient body towards the closed position, the spring assembly comprising;
a spring comprising a proximal mounting end that is mounted to a portion of the downstream surface of the intermediate portion of the resilient body, a distal end having a curved cross sectional shape in which a bottom portion of the curved cross-sectional shape is configured to slideably engage portions of the downstream surface of the flap portion, and a middle portion that extends from the proximal mounting end to the distal end, the middle portion being substantially planar when the spring is in a relaxed position; and
a backing plate that is mounted to a portion of the upstream surface of the intermediate portion of the resilient body in opposition to the proximal mounting end.

* * * * *